Figure 1:
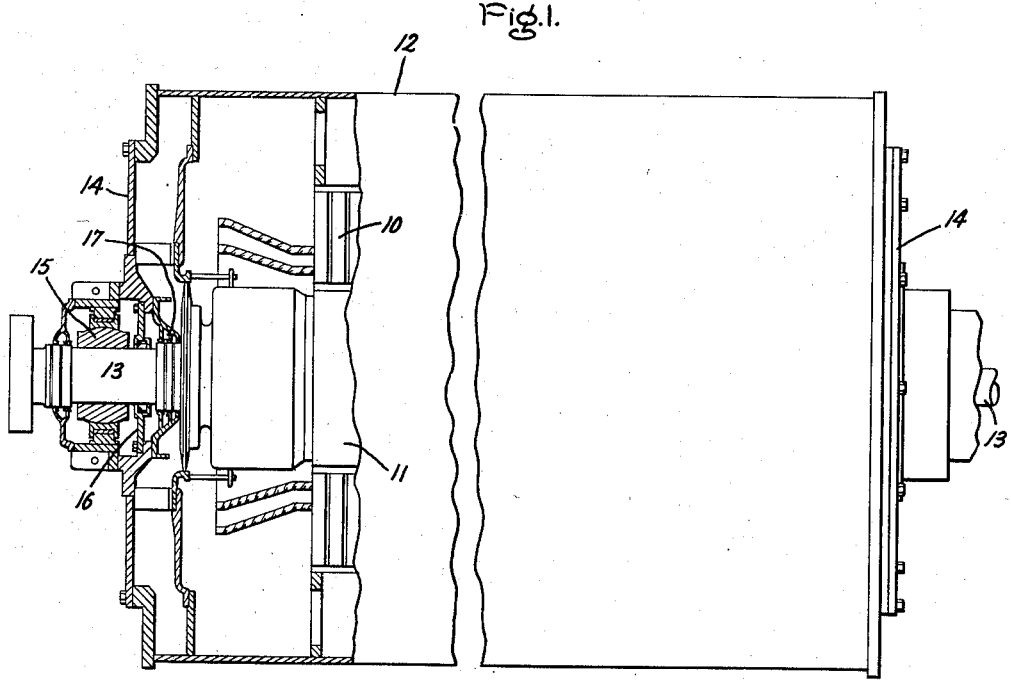

Aug. 4, 1953     L. P. GROBEL     2,647,771
SHAFT SEAL

Filed Nov. 14, 1949     2 Sheets-Sheet 1

Inventor:
Lloyd P. Grobel,
by Ernest C. Britton
His Attorney.

Aug. 4, 1953 — L. P. GROBEL — 2,647,771
SHAFT SEAL
Filed Nov. 14, 1949 — 2 Sheets-Sheet 2
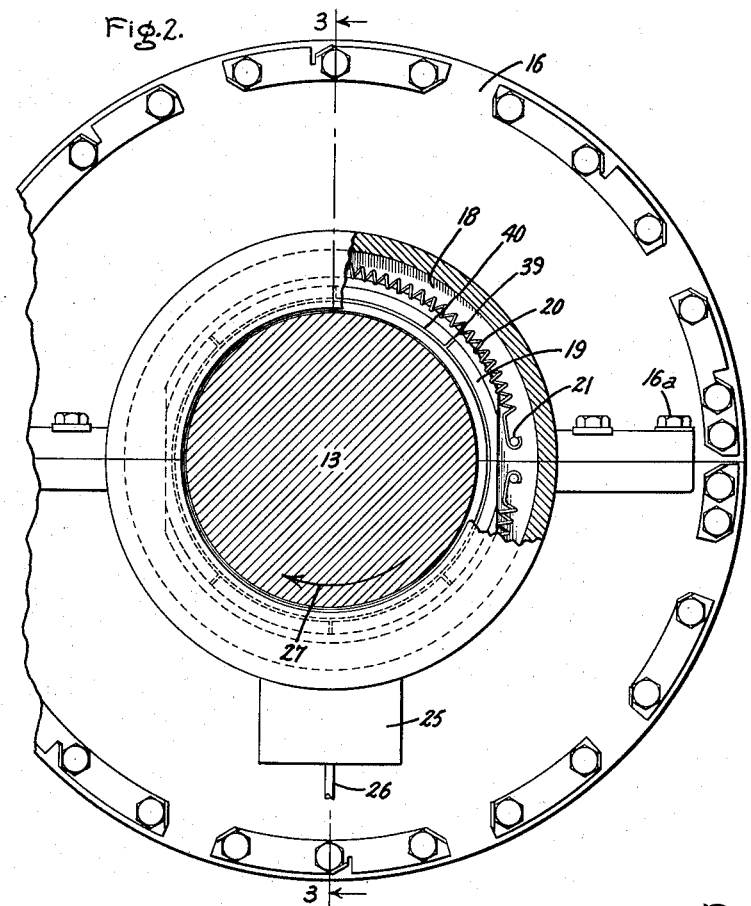
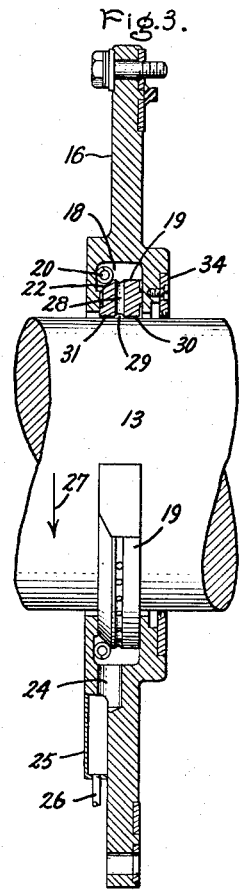
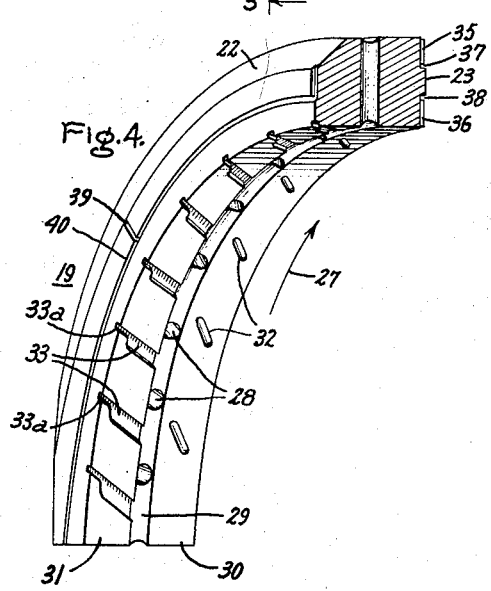
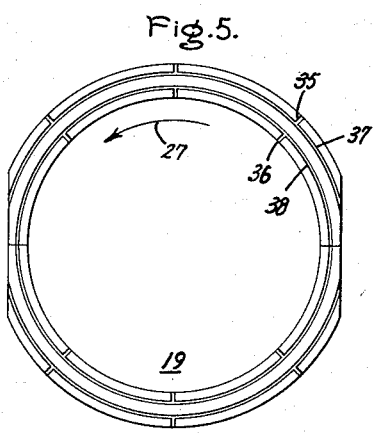
Inventor:
Lloyd P. Grobel,
by Ernest C. Britton
His Attorney.

Patented Aug. 4, 1953

2,647,771

UNITED STATES PATENT OFFICE 2,647,771

SHAFT SEAL

Lloyd P. Grobel, Schenectady, N. Y., assignor to General Electric Company, a corporation of New York Application November 14, 1949, Serial No. 127,098

3 Claims. (Cl. 286—5)

My invention relates to shaft seals and particularly to liquid film seals used for preventing the escape of gas between a shaft and its enclosing casing. The invention has particular significance in connection with gas filled machines such as hydrogen cooled generators.

In a gas cooled generator, an enclosing casing is provided which is filled with a ventilating gas which is circulated in the casing and through the machine to ventilate the various windings and other internal parts. Openings are arranged in the ends of the enclosing casing for the shaft of the machine, and a seal is provided between the shaft and the casing adjacent each such opening to prevent loss of ventilating gas by leakage from the casing, and also to prevent contamination of ventilating gas by leakage of air thereinto. Generally, the seal employs fluid and it is also desirable to prevent contamination of ventilating gas by sealing fluid and contamination of sealing fluid by ventilating gas.

An object of the present invention is to provide means for maintaining substantially constant the purity of the cooling gas in a gas-filled dynamoelectric machine without the use of elaborate and costly purging and purifying apparatus.

Another object of the invention is to provide an improved shaft seal of the liquid film type designed to minimize the flow of sealing liquid required to provide the seal.

A further object of the present invention is to provide a single ring shaft seal characterized by a low sealing fluid flow to the enclosed gas side of the seal.

A still further object of the invention is to provide an improved sealing ring to be used with dynamoelectric machines of the above mentioned type.

In the illustrated embodiment, the means employed in the furtherance of these objects comprises, for a shaft seal for a hydrogen cooled generator, means for feeding sealing oil to a seal housing containing a single ring made in arcuate halves held together and against the housing side by springs fastened to the housing. The seal oil flows through radial holes in the ring to a groove on the inner periphery of the ring and then most of the oil goes to the atmosphere side but a part goes to the hydrogen side of the ring. The hydrogen side has pump-back grooves to reduce the oil flow and the air side has grooves which permit a greater oil flow to provide cooling for the entire ring.

Further objects and advantages will become apparent, and my invention will be better understood, from consideration of the following description taken in connection with the accompanying drawing in which Fig. 1 is a partial sectional side view of a dynamoelectric machine, such as a large generator, embodying my improved shaft seal; Fig. 2 is an enlarged end view, partly in section, of the shaft 13, shaft seal, and seal housing 16 of Fig. 1; Fig. 3 is a cross-sectional view taken on the line 3—3 of Fig. 2; Fig. 4 is a perspective view, partly in section, of the sealing ring 19 of Figs. 2 and 3; and Fig. 5 is a back view of the ring 19 of Figs. 2, 3, and 4.

Referring now to the drawing, I have shown a dynamoelectric machine including a stationary member 10 and a rotatable member 11 about both of which an enclosing casing 12 is arranged and filled with a ventilating gas assumed, for purposes of illustration, to be hydrogen. In a manner well understood by those skilled in the art, the ventilating hydrogen within the casing 12 is circulated therein and through the various windings and parts of the machine. The rotatable member 11 includes a shaft 13 which extends through end walls 14 of the enclosing casing 12 and is supported by bearings one of which is shown at 15. The bearings are carried, indirectly, by the end walls 14.

Under various operating conditions of the machine, it is desirable to maintain different ventilating gas pressures within the enclosing casing 12. Under all such conditions, it is desirable that a seal be provided about the shaft to prevent either the escape of gas from the casing or the introduction of ambient air into the casing. Accordingly, at each end of the machine of Fig. 1, there is located a shaft seal arrangement which includes a seal housing member 16 which may be more clearly seen in Figs. 2 and 3. To facilitate assembly, this housing may be made in two semi-circular halves held together as by bolts 16a. Housing member 16 may, as shown, be attached to the end plate 14 (or to any stationary part such as the adjacent bearing). If desired, additional oil deflector rings 17 may also be utilized on the inboard side of the seal housing. As illustrated in the drawing, housing member 16 is of such shape that an annular chamber 18 opening onto the shaft is provided therein. In the chamber 18, a sealing ring 19 is arranged about the shaft such that if the shaft moves radially, the ring will move with the shaft. Accordingly, ring 19 (which is made in two arcuate halves, a top half and a bottom half, although, of course, a different number of segmental parts could be used if desired) has its segmental parts arch bound together about the shaft 13 by spring bands or garter springs 20 arranged about the ring segment peripheries and having their ends attached by pins 21 to the stationary seal housing 16.

It is necessary and desirable to provide that no sealing fluid (which is pumped into chamber 18 as hereinafter described) will flow from the annular chamber 18 between ring 19 inner (i. e., hydrogen side) face and the adjacent wall of the chamber. Accordingly, each ring half is provided with a chamfered surface 22 which is engaged by the corresponding spring 20 so that the garter springs serve the dual purposes of holding the ring halves together about the shaft and meanwhile urging them axially inward to prevent escape of sealing fluid from chamber 18 along the hydrogen side radial face 23 of ring 19; the ring face 23 and the mating surface of housing 18 being machined or ground smooth to provide the closest possible fit.

If a sealing ring is used with a large clearance between the ring and the shaft, a sufficient amount of sealing liquid lubricant (such as oil) may pass between the shaft and sealing ring to cool the latter, and prevent expansion (due to heat) further increasing the clearance, but it is desirable to have a relatively small clearance between shaft and at least the inboard side of the ring to prevent excessive escape of the sealing fluid to the gas filled interior of the machine thus necessitating vacuum or other treatment of the oil to remove the hydrogen from oil subsequently withdrawn from the casing. However, the elaborate equipment necessary for such treatment can be dispensed with if only a small amount of oil is allowed to leak past the sealing ring into the enclosing casing from which it may be periodically drawn off and economically regarded as waste. With my improved sealing arrangement, the problem is solved by using a single ring seal with one portion of the ring designed for relatively large rate of oil flow for ring cooling purposes and another portion of the ring designed for relatively small rate of oil flow to prevent excessive amounts of sealing oil mixing with the hydrogen or other gas within the machine casing. Accordingly, as shown in Fig. 3, a liquid lubricant, sealing and cooling fluid, such as oil, is circulated into the annular chamber 18, the oil being fed into the seal chamber through a passage such as passage 24 communicating with a chamber 25 assumed connected to a pressurized oil supply by a pipe 26 (although the particular arrangement for connecting the seal chamber 18 to an oil supply is unimportant to my invention).

During operation the sealing oil pressure is conventionally automatically regulated at a pressure slightly higher than the hydrogen pressure. For example, if the hydrogen pressure is 25 p. s. i., the oil pressure should be about 30 p. s. i. If ordinary untreated oil is used, it will carry tiny bubbles of air inside the machine casing and some provision must be made to assure that it will not eventually dilute the hydrogen gas to a point approaching an explosive mixture. With the invention as herein described, however, the design of the shaft seal is so improved that there is so little oil flow to the hydrogen side of the sealing ring that the whole machine need not be scavanged for long periods of time and practically never if small amounts of gas are periodically drawn off from the limited space between seal housing 16 and oil deflectors 17.

Conventionally, for a large dynamoelectric machine such as the one illustrated in Fig. 1, the rotatable member is adapted to rotate only in a single direction. In the illustrated arrangement this direction is assumed to be as indicated by the arrows 27 of Figs. 2, 3, 4 and 5. As will be observed in Figs. 3 and 4, the ring 19 is provided with radial holes 28 providing communication from chamber 18 adjacent the ring outer peripheral surface to a groove 29 formed in the inner peripheral surface of the ring and defining thereon lands 30 (on the hydrogen or inner radial side) and 31 (on the atmosphere or outer radial side). The land 30 is provided with a plurality of pump-back grooves 32 which are properly angled (with respect to normal shaft rotation) to reduce sealing oil flow toward the hydrogen filled casing and provide a relatively slow flow thereto. The opposite (or bearing side) land 31 is provided with a plurality of grooves 33 so designed that they permit a relatively greater oil flow, e. g., such as to provide the cooling for the entire ring.

As will be seen in Fig. 4, the hydrogen side pump-back grooves 32 are not continuous from supply groove 29 to the hydrogen side of the ring because it is desired to have little or no communication between the hydrogen (or other cooling gas) and the sealing fluid. These discontinuous grooves 32 are inclined with respect to the longitudinal axis (through the center of the shaft) at a pitch or angle which is proper having in mind the various design considerations and, as shown in the drawing, this pitch may be about 60° in such a direction that with a shaft rotation assumed in the direction indicated by arrow 27, the grooves 32 will tend to pump back sealing oil towards the annular supply groove 29. The pump-through grooves 33 are continuous from supply groove 29 to the air or bearing side of the ring and are inclined to the axis at about 30° as shown, (although any angle suitable in view of the various design considerations could be used). However, it should be noted that the direction of inclination with respect to direction of shaft rotation is the same for grooves 33 as that for grooves 32. However, it is obvious that a groove which has a pump-back action on one side has a pump-through action on the other, and, functionally with respect to the oil supply groove 29, the two sets of grooves are pitched in opposite directions since one set of grooves 32 pumps to the oil supply groove and the other set of grooves 33 pumps away from the oil supply groove. However, grooves 32 will not pump hydrogen through because they are discontinuous and because the sealing liquid pressure is to be kept higher than the hydrogen pressure. If desired, the pump-through grooves 33 may each have a narrow neck outlet 33a acting as an orifice to speed up the flow of fluid at this point and assist in insuring that any small dirt particles will be rapidly forced away from the mating surfaces of sealing ring and shaft.

As shown in Fig. 3, an annular ring 34 may be bolted to the seal housing 16 and engage the shaft 13 to assure co-axial alignment of seal housing with respect to shaft.

As previously stated the sealing oil is desirably kept at a pressure greater than the hydrogen gas pressure which is conventionally greater than atmospheric pressure. This imposes some axial loading upon the ring and, in order to relieve such loading (especially at the higher gas and oil pressures) by venting the ring sides, I have provided a plurality of radial grooves 35 and 36 leading to circumferential grooves 37 and 38 (respectively) in the hydrogen side face 23 of the ring and a plurality of radial grooves 39 leading to a circumferential groove 40 on the opposite or atmosphere side face of the ring 19.

In operation, sealing oil fed to the housing 18 flows through the radial holes 28 in ring 19 and to the sealing surfaces between the ring and the rotating shaft. Some oil may flow to the hydrogen side of the ring, but the hydrogen side pump-back grooves 32 effectively limit this oil flow, while the air side grooves 31 give a greater oil flow sufficient to provide cooling of the entire ring. If the ring was (as in the prior art) actually two rings, one on each side of the supply, the hydrogen side sealing ring would become too hot because of small oil flow and would then expand allowing a large flow of sealing oil into the casing or interior of the associated machine.

With the invention herein described and claimed, the hydrogen and air seal rings are made as a single ring with resultant small running clearance and low oil flow to the hydrogen side. Not only is the hydrogen side of the ring restrained from expanding because of conduction of heat through the ring to the cooled air-side half, but the hydrogen side is also restrained from expanding by its mechanical interconnection with the integrally formed air-side half (which is cooled) so that there will always be a small running clearance between the sealing ring (hydrogen side) and the shaft to allow the pump-back grooves to adequately limit the oil flow, and this feature becomes of particular importance in the larger size machines (since flow is proportional to shaft diameter and to the third power of the clearance). Tests of a ring made in accordance with the invention, and applied to a 14 inch diameter shaft running at 3600 R. P. M., indicated that the oil flow to the hydrogen side of the ring was less than 0.1 G. P. M., or much less than could be obtained under comparable conditions with conventional seals. These tests also indicated that with the invention there could be far greater cooling of the ring and a resulting superior operation thereof.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. The combination with a shaft having a normal direction of rotation and a wall through which the shaft projects, of a seal housing having an annular chamber opening onto the shaft, a sealing ring located in said annular chamber and arranged about said shaft and having an annular groove in the inner periphery thereof with said groove defining a land in said ring inner periphery on each side of said groove, means for supplying sealing liquid to said annular chamber and through said ring to said annular groove, spring means for biasing said sealing ring against an inner wall of said annular chamber to prevent leakage between said ring and said wall, said ring having discontinuous grooves in the ring inner periphery land adjacent said annular chamber inner wall, said grooves being pitched so that for said normal direction of shaft rotation said grooves will act as pump back grooves to reduce sealing liquid flow from said annular groove between said land and said shaft, and said ring having continuous grooves across the opposite land from said annular groove to the outside of said ring with said last mentioned grooves being pitched to provide a relatively greater sealing liquid flow across said land to provide cooling of said ring.

2. A dynamoelectric machine having a gas filled casing and a rotatable member with a shaft extending through said casing, means for supplying gas under pressure to said casing, and a shaft seal for sealing against leakage of said gas from the interior of said casing, said seal comprising a sealing ring having an inner peripheral groove opening onto a portion of said shaft and dividing the inner periphery of said ring into two inner surface portions, said ring having a plurality of radial openings opening into said annular groove for supplying cooling, lubricating and sealing medium thereto, and having a plurality of grooves on one of said ring inner surface portions with each of said grooves being angled with respect to the axis of the machine and having its ends respectively spaced from said annular groove and from the adjacent outer edge of said ring whereby said grooves will act as pump back grooves with respect to sealing medium supplied under pressure to said annular groove and having a plurality of grooves on the other of said ring inner surface portions with each of said last-mentioned grooves being angled with respect to the axis of the machine and extending across said surface portion to communicate with said annular groove and with the adjacent outer surface of said ring whereby said last-mentioned grooves will act as a pump through grooves to provide sufficient sealing fluid flow from said annular groove to cool said sealing ring.

3. A dynamoelectric machine having a gas filled casing and having a rotatable member having a shaft extending through said casing, a shaft seal housing located between said casing and said shaft and having an annular chamber opening onto said shaft, means for supplying sealing medium under pressure to said seal housing, a sealing ring comprising arcuate segments located in said annular chamber and arranged about said shaft, said ring having an inner peripheral surface, an inner radial side adjacent said gas filled casing, an outer radial side, an outer peripheral surface and a chamfered side adjacent said outer peripheral surface and said outer radial side, said ring inner peripheral surface having an annular groove therein defining on one side a portion of said surface adjacent said inner radial side and on the other side of said groove a portion adjacent said outer radial side, said ring having radial grooves communicating with said annular groove and with said outer peripheral surface for allowing the introduction of said sealing medium to said annular groove, said ring inner peripheral surface portion adjacent said inner radial side having discontinuous grooves pitched for normal direction of shaft rotation to pump-back a portion of said sealing medium to said annular groove, said ring inner peripheral surface portion adjacent said outer radial side having continuous narrow mouthed grooves communicating with said annular groove and with said outer radial side and pitched for normal direction of shaft rotation to pump through a substantial portion of said sealing medium to provide cooling of both halves of each of said integrally formed arcuate ring segments, said ring inner radial side having at least one annular groove formed therein and a plurality of radial grooves communicating with said annular groove and with said outer peripheral surface for venting said inner radial side of said sealing ring, said ring outer radial side having at least one annular groove formed therein and a plurality of radial grooves communicating with said annular groove and with said chamfered side for venting said outer radial side of said sealing ring, and means including a plurality of garter springs having their ends secured to said seal housing and extending around said chamfered side to bias said sealing ring toward the inner wall of said housing adjacent said casing and to bias said sealing ring arcuate segments together about said shaft.

LLOYD P. GROBEL.

References Cited in the file of this patent

UNITED STATES PATENTS

| Number | Name | Date |
|---|---|---|
| 1,484,525 | Noeggerath | Feb. 19, 1924 |
| 1,770,496 | Lawaczeck | July 15, 1930 |
| 1,846,598 | Hodgkinson | Feb. 23, 1932 |
| 2,265,953 | Mortensen et al. | Dec. 9, 1941 |
| 2,314,207 | Grobel | Mar. 16, 1943 |
| 2,356,011 | Sheldon | Aug. 15, 1944 |
| 2,501,304 | Baudry et al. | Mar. 21, 1950 |